US006427957B1

(12) United States Patent
Finneman et al.

(10) Patent No.: US 6,427,957 B1
(45) Date of Patent: Aug. 6, 2002

(54) STOWABLE SUPPORT SYSTEM

(75) Inventors: Darrell R. Finneman, Albany; Joseph E. Alves, Springfield; Curtis C. Kucera, Eugene, all of OR (US)

(73) Assignee: Rosen Products LLC, Eugene, OR (US)

( * ) Notice: Subject to any disclaimer, the term of this patent is extended or adjusted under 35 U.S.C. 154(b) by 0 days.

(21) Appl. No.: 09/627,704

(22) Filed: Jul. 28, 2000

(51) Int. Cl.$^7$ ............................................... F16M 11/06
(52) U.S. Cl. ........................ 248/185.1; 74/527; 403/103
(58) Field of Search .............................. 248/185.1, 108, 248/297; 74/527; 403/93, 96, 103

(56) References Cited

U.S. PATENT DOCUMENTS

| | | | | |
|---|---|---|---|---|
| 4,463,632 A | * | 8/1984 | Parke | 81/177.9 |
| 4,658,667 A | * | 4/1987 | Schuller | 74/475 |
| 5,134,898 A | * | 8/1992 | Anderson | 74/527 |
| 5,143,468 A | * | 9/1992 | Pausch | 403/92 |
| 5,179,447 A | | 1/1993 | Lain | |
| 5,277,438 A | * | 1/1994 | Chuang | 289/42 |
| 5,456,135 A | * | 10/1995 | Li | 74/551.7 |
| 5,547,305 A | * | 8/1996 | Treche | 403/97 |
| 5,620,272 A | * | 4/1997 | Sheng | 403/96 |
| 5,689,999 A | * | 11/1997 | Wiley et al. | 74/527 |
| 5,713,633 A | * | 2/1998 | Lu | 297/364 |
| 5,802,755 A | * | 9/1998 | Tortorici et al. | 42/75.2 |
| 5,816,614 A | * | 10/1998 | Kramer, Jr. et al. | 280/775 |
| 6,142,499 A | * | 11/2000 | Hsieh et al. | 280/291 |

FOREIGN PATENT DOCUMENTS

JP            5-131879            5/1993

* cited by examiner

Primary Examiner—Ramon O. Ramirez
Assistant Examiner—Kofi Schulterbrandt
(74) Attorney, Agent, or Firm—Kolisch Hartwell Dickinson McCormack & Heuser

(57) ABSTRACT

A stowable support system having an arm and an attachment member pivotal through a plurality of angular positions relative to the arm. The arm includes a follower assembly with a surface portion of a first contour, with the attachment member including a surface portion of a second contour that is cooperative to the first contour. A rest position is defined by at least one of the plurality of angular positions, in which the surface portions of the follower assembly and attachment member are in mating contact. The follower assembly and attachment member are biased toward engagement with each other, with at least one of the attachment member and the follower assembly being configured to be resiliently deformed when the attachment member is pivoted out of the rest position.

21 Claims, 4 Drawing Sheets

STOWABLE SUPPORT SYSTEM

TECHNICAL FIELD

The present invention relates generally to stowable support systems and, more particularly, to a stowable support system adapted for use in supporting an electronic device in a vehicle.

BACKGROUND OF THE INVENTION

Stowable support systems for retractably positioning a supporting surface or other object near a seated or standing person are used in various different environments, and are often installed in automobiles, aircraft, and other vehicles. Typically, such systems include a moveable arm having a proximal end connected to a base structure and a distal end connected to a deployable object. In aircraft and other vehicles, the proximal end of the arm may be connected to the floor of the vehicle or to a portion of a passenger seat. The arm is typically adapted for movement between a stowed position and a deployed position to facilitate access to, and storage of, the deployable object.

For example, commercial aircraft commonly provide stowable tray tables for each passenger. The tray table for a particular passenger typically is connected by an arm or arms to the seat in front of the passenger. Another example of a stowable system is a personal entertainment device, such as a DVD player with an arm that allows the device to be moved between a deployed position and a stowed position in an aircraft.

A common design consideration for stowable support systems is securely maintaining a supported object in a deployed position. For example, in some systems, the distal end of the support arm is pivotally connected to an object so that the object may be rotated through a plurality of angular positions relative to the arm. In these systems, it is usually desired that the object be deployed in a particular pivotal position relative to the support arm. Some such systems do not securely maintain the supported object in the deployed position. This problem is often addressed by providing various locks, tightening devices and other mechanisms for securely maintaining the object in the desired position. These designs normally require the user to manually operate the tightening/locking mechanism to secure the support arm in a deployed state and/or to stow the support arm and the object that it supports. These manually operated mechanisms complicate the operation of stowable support systems and increase costs associated with manufacture of these systems.

In addition, known stowable support systems have a number of disadvantages related to the problem of deploying and stowing electronic devices such as personal entertainment systems. Many stowable support systems have trays or supporting surfaces that are significantly larger than the personal entertainment device that they are to support. The systems are thus unnecessarily bulky. Still other designs employ a personal entertainment device permanently or semi-permanently secured to an end of the support arm. These "hard-mounted" designs are inflexible in that the system cannot be easily used to support objects other than the integrated device. In addition, a hard-mounted arrangement significantly complicates and increases costs associated with upgrading, repairing or replacing the device.

SUMMARY OF THE INVENTION

Accordingly, the present invention provides an improved stowable support system, including an arm with a follower assembly having a surface portion of a first contour, and an attachment member pivotal through a plurality of angular positions relative to the arm. The attachment member includes a surface portion of a second contour that is cooperative to the first contour. At least one of the plurality of angular positions defines a rest position in which the surface portion of the attachment member is in mating contact with the surface portion of the follower assembly. The follower assembly and attachment member are biased toward engagement with each other, and either the follower assembly or attachment member (or both) is adapted to be resiliently deformed when the attachment member is pivoted out of the rest position, to maintain the system in the rest position.

The stowable support system may further include a support platform secured to the attachment member and adapted to support an object such as an electronic entertainment device. In addition, the follower assembly may take the form of a follower urged by a spring into contact with the exterior surface of the attachment member. The stowable support assembly may further include a second attachment member secured to an opposite end of the arm and pivotable through a plurality of angular positions relative to the arm. The second attachment member also may have a surface portion or portions having a contour cooperative to the contour of the follower assembly's surface portion.

When the system is provided with two attachment members, the follower assembly may be adapted to contact both attachment members, and may take the form of two followers with an interposed spring that urges the followers into contact with the opposed attachment members. The followers thus may be urged into contact with the attachment members to maintain the attachment members in predefined rest positions. The predefined rest positions occur when the followers are in mating contact with surface portions provided on the attachment members.

DETAILED DESCRIPTION AND BEST MODE OF PRACTICING THE INVENTION

The present invention relates to an improved stowable support system that may be easily moved between a deployed position and a stowed position. The assembly includes an arm and other structures adapted to securely hold a deployable structure, such as a support platform, in one or more rest positions without need for locking buttons, tightening knobs or other manually-operated mechanisms. The stowable support system is versatile in that it may be used to deployably support a variety of structures and devices. The system is particularly well suited for use in commercial aircraft or other vehicles to support devices such as personal entertainment systems in locations that are easily accessible to passengers. When used with personal entertainment systems and various other types of devices, the stowable support system allows the device to be easily swapped, repaired or upgraded.

Figure 1:
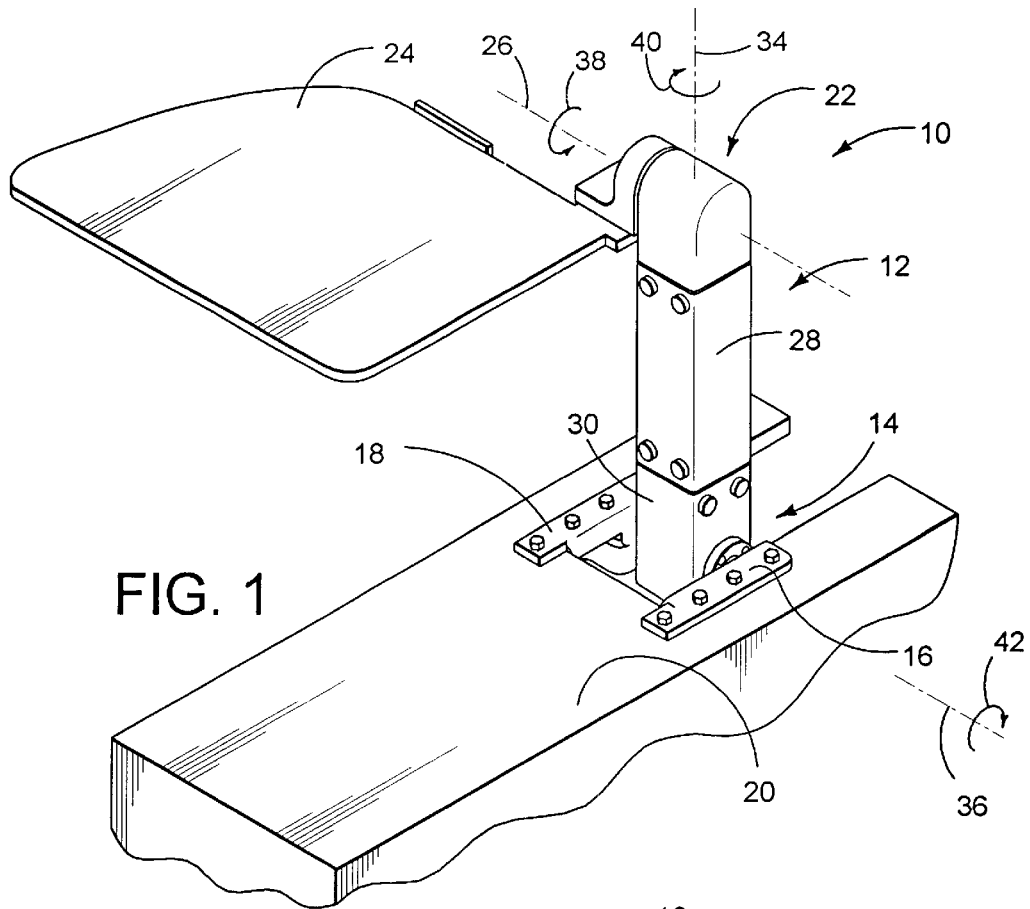
FIG. 1 is an isometric view of a stowable support system constructed according to the present invention.

FIG. 1 depicts an embodiment of a stowable support system 10 constructed according to the present invention. System 10 includes an elongate arm 12 having opposed ends. In the depicted embodiment, arm 12 is straight, though the arm may be angled, curved, or formed to have any other desired shape. Proximal end 14 of arm 12 may be adapted to be secured to a base, such as a floor or a portion of a passenger seat of an aircraft. End 14 may be variously referred to as a base end or vehicle end of arm 12. In the depicted embodiment, the proximal end of the arm is pivotally secured by brackets 16 and 18 to a console box 20, which is designed to be installed in a seat console area positioned in the side of an aircraft passenger seat.

Distal end 22 of arm 12 may be adapted to allow a wide variety of devices or structures to be secured to and supported by the arm. For example, an electronic device such as a DVD player, palm theater or other personal entertainment device may be secured to the distal end of the arm. Alternatively, as shown in FIG. 1, a support, such as support platform 24, may be secured to the arm. Distal end 22 may thus be variously referred to as a platform end or support end of arm 12. Support platform 24 may be used to support virtually any object, subject to size and weight limitations, and thus makes the stowable support system extremely versatile. When used to support devices in aircraft, trains, and other vehicles, the depicted system allows the supported device to be easily swapped, replaced, repaired or upgraded. The invented system thus provides a substantial advantage over support systems where a particular device, such as a DVD player, is "hard-mounted" or otherwise integrated with an end of the support arm. Performing the above operations on hard-mounted systems can be much more involved and often requires using tools to remove the supported device from the arm.

Arm 12 may be adapted so that the attached structure is easily moved between a stowed and a deployed position. In depicted system 10, various components of the assembly are moveably interconnected to achieve the deploying/stowing functionality. First, support platform 24 is pivotally attached to platform end 22 of arm 12 so that the platform may be rotated relative to the arm about axis 26. As will be later explained, the connection between the arm and the support platform may be configured to limit the range of pivotal motion and to provide one or more "stops," or rest positions for the support platform.

Second, arm 12 may include two or more separate sections that are moveable relative to each other. The depicted arm includes an upper arm section 28 and a lower arm section 30 that have matching cross-sections and are aligned co-axially end-to-end. As will be discussed in more detail with reference to FIGS. 3 and 4, the two sections are coupled so that they may rotate relative to one another about the length of arm, i.e. about axis 34. This connection may also be adapted to limit the permitted range of rotational motion.

Third, base end 14 of arm 12 may be pivotally attached to base 20 so that the arm pivots about axis 36. Similar to the connection between support platform 24 and arm 12, this connection may be adapted to define a limited range of pivotal motion, and to provide one or more stops or rest positions.

Figure 2:
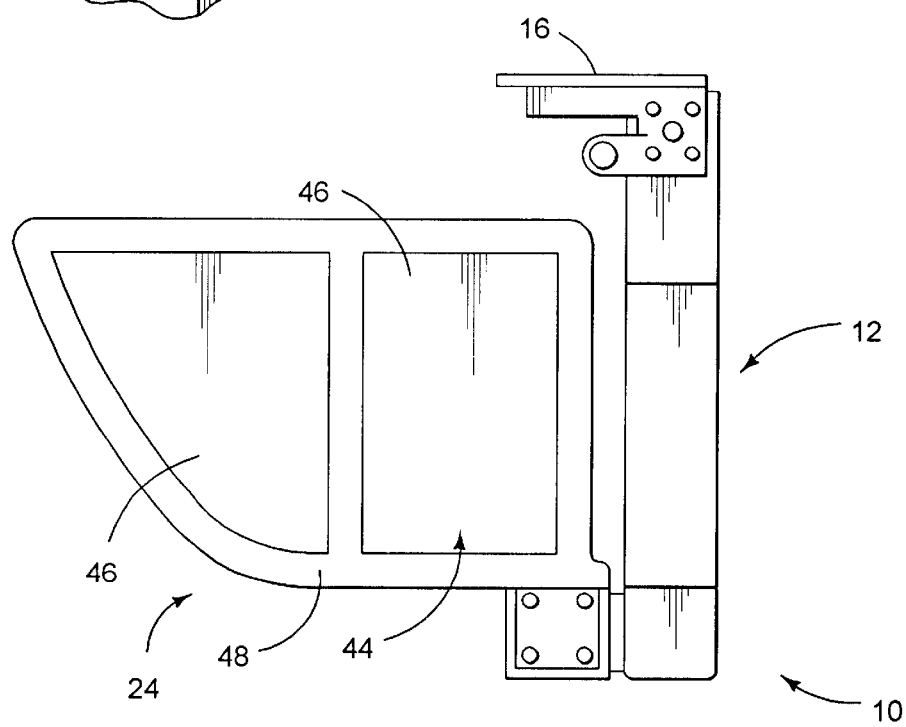
FIG. 2 is a side plan view showing the stowable support system of FIG. 1 in a stowed position.

FIG. 2 is a side view depicting the system of FIG. 1 in a stowed position. In the stowed position, support platform 24 is stored within the interior of seat console box 20, so that the platform is positioned alongside a passenger seat. To move the stowable support system from the deployed position shown in FIG. 1 to the stowed position shown in FIG. 2, system 10 may be moved as follows: First, upper arm section 28 is swiveled/pivoted ninety degrees relative to lower arm section 30 about axis 34 in direction 40. Second, support platform 24 is pivoted relative to arm 12 ninety degrees about axis 26 (which has been rotated ninety degrees from its depicted orientation) in direction 38. The entire arm is then pivoted relative to base 20 about axis 36 in direction 42 to complete the stowing of the system. These steps are typically performed in the recited order, though the steps may be performed in a different order as desired.

Easy movement of support platform 24 between the deployed and stowed positions provides a number of advantages when the system is used in aircraft and other vehicles having passenger seats. The system may be stowed when not in use to give the passenger more room, and to allow the passenger to enter and exit the seat. The system may also be moved out of the way to more easily allow other passengers to move past the seat. The deploying/stowing capability in general allows for more efficient and varied use of space in a confined area such as an aircraft passenger compartment.

In addition to these benefits, the arm secures the attached structure to the base structure and thus provides protection against theft or loss. The system also provides safety benefits when employed in moving vehicles by preventing the attached structure from moving within the passenger compartment of the vehicle. This is particularly desirable during rapid changes in velocity and/or direction, such as during takeoff and landing of an aircraft.

As seen in FIG. 2, bottom surface 44 of support platform 24 may be provided with one or more recesses 46 and upstanding rib sections 48 surrounding the recessed portions. The rib-and-recess arrangement uses a minimum amount of material and thus yields a lightweight design, without significantly compromising the strength of the support platform. The platform may be formed by machining or milling the recesses into the surface of a uniformly thick piece of material, or by molding a platform with such a shape.

The arm, platform and other components of the system may be formed from any suitable material, including plastic, metal or various other materials. In many applications, it is desirable that the components be formed from a lightweight metal, such as aluminum. In addition, it is often desirable to anodize or otherwise treat exposed surfaces of the system's components, or to provide the exposed surfaces with a brushed texture.

The stowable support system and its components may be made in any desired size, subject to dimensional constraints imposed by the environment in which the assembly will be used. For example, when adapted for use with a passenger seat, the arm should be sized so that, when in a deployed position, the platform is easily accessible to the passenger. Also, the platform should be sized to adequately support the objects that are intended for use with the stowable assembly.

For example, when used with palm theaters, DVD players or other portable electronic devices, the platform should be sized to have a supporting surface slightly larger than the footprint of the electronic device, but should not be so large as to be unnecessarily bulky.

Figure 3:
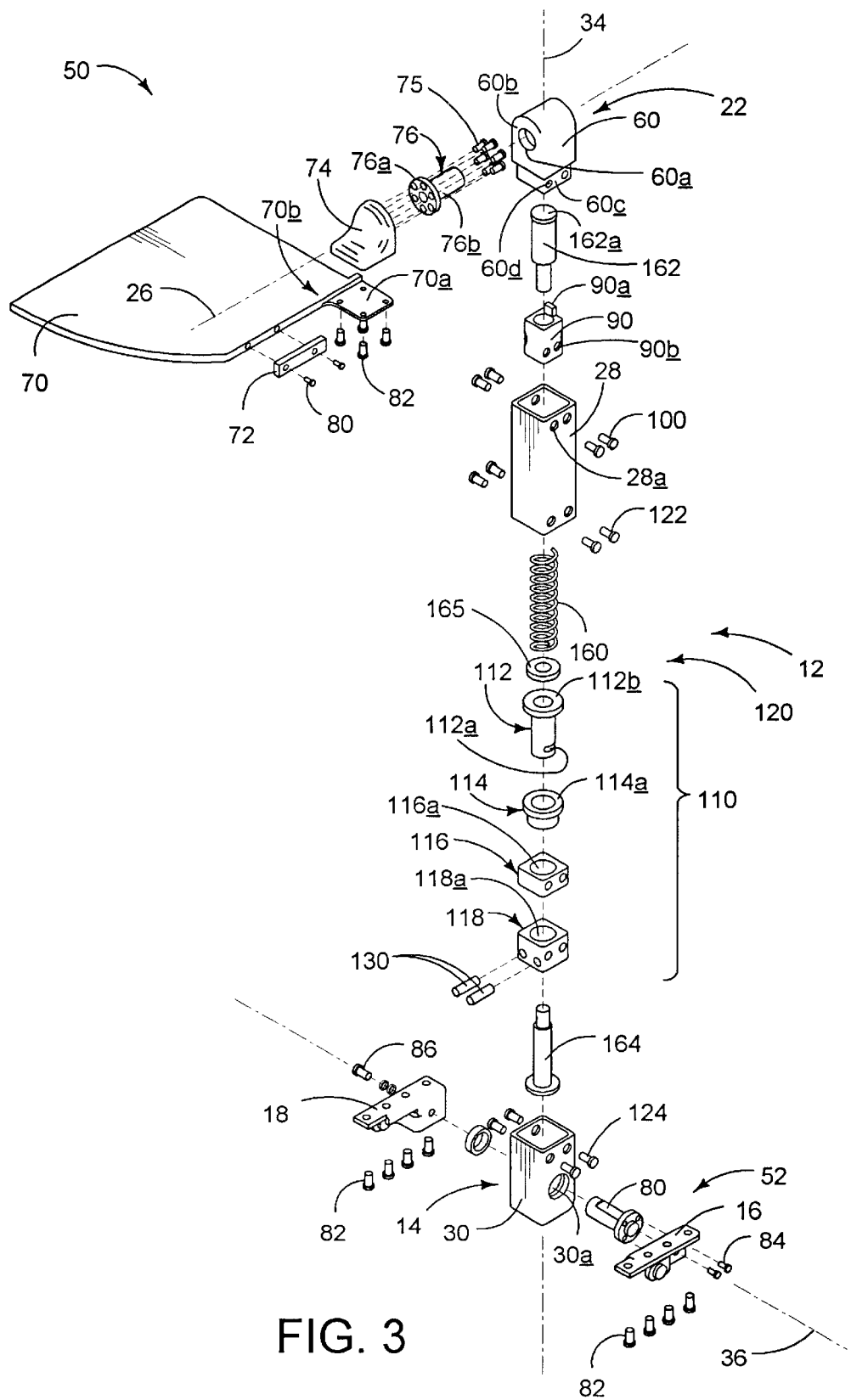
FIG. 3 is an exploded isometric view of a stowable support system similar to that shown in FIG. 1.

FIG. 3 is an exploded isometric view showing various component parts that may be used to construct a stowable support system according to the present invention. Generally, arm 12 extends between a platform assembly 50 connected to platform end 22 of the arm and a seat mount 52 connected to base end 14 of the arm. The main structural components which form the visible outer surface of the depicted arm are upper arm cap 60, upper arm section 28 and lower arm section 30. In the depicted embodiment, these components have generally square cross-sections, though the arm components may be cylindrical or formed in any other desired shape. In addition, the arm cap and arm sections typically are at least partially hollow to accommodate various internal components of arm 12, as will be explained.

As depicted in FIG. 3, platform assembly 50 may include a support platform 70, a stop plate 72, a platform shoulder 74 and an attachment member 76. In the depicted assembly, stop plate 72 is secured to an edge of support platform 70 with fasteners 80 in order to provide a lip for preventing supported objects from sliding or falling off of the support platform. Alternatively, a plurality of stop plates may be provided on one or more sides of the platform, or an upstanding ridge may be provided about the perimeter of the platform.

Platform shoulder 74 includes a generally flat bottom surface (not shown) that rests against and is secured by fasteners 82 to a fastening plate 70a that depends from a corner region 70b of support platform 70. Platform shoulder 74 also includes a flat side surface (not shown) that mates with and is secured by fasteners 75 to a circular flange 76a formed on an end of attachment member 76. In the depicted embodiment, the platform assembly components (platform 70, stop plate 72, platform shoulder 74 and attachment member 76) are secured together so that they are immoveably fixed relative to one another.

As will be appreciated by comparing FIGS. 1 and 3, the stowable support system may have either a left or right-handed configuration. Specifically, support platform 24, shown in FIG. 1, is adapted so that when used with a passenger seat, the deployed platform will extend toward a seated passenger from the right armrest region of the seat. The stowable system shown in FIG. 3 has an alternately configured platform 70 that is adapted to extend toward a seated passenger from the left armrest region of the seat.

Referring still to FIG. 3, seat mount 52 may include brackets 16 and 18, a supporting base structure (not shown) and an attachment member 80, all secured together with various fasteners. Specifically, fasteners 82 secure brackets 16 and 18 to the supporting base, and attachment member 80 extends between and is secured at its ends to the brackets by fasteners 84 and 86. As with the platform assembly, the various components of seat mount 52 typically are secured together so that they are immoveably fixed relative to each other.

To secure platform assembly 50 to arm 12, a portion of attachment member 76 is inserted through a blind hole 60a into a hollow interior region of upper arm cap 60. Specifically, as seen in FIG. 3, attachment member 76 has a main body 76b that extends from circular flange 76a. Main body 76b is inserted into upper arm cap 60 through hole 60a until flange 76a is adjacent and closely spaced from an outside face 60b of the upper arm cap. In this inserted position, the opposite end of attachment member 76 extends through the interior of upper arm cap 60 to a side of the upper arm cap opposite opening 60a.

Attachment member 76 may be secured within upper arm cap 60 by a sleeve 90. As seen in FIG. 3, the sleeve may include a tang 90a that extends into a circumferential groove 76c (shown in FIG. 8) that may be formed on the end of attachment member 76 opposite flange 76a. When disposed in the circumferential groove, tang 90a secures platform assembly 50 to arm 12 by preventing main body 76b of attachment member 76 from pulling out of its inserted position within upper arm cap 60.

Attachment member 76, upper arm cap 60 and sleeve 90 may be adapted to provide a sliding interface between the attachment member and platform end 22 of arm 12. This allows attachment member 76 and the rest of the platform assembly to pivot through a plurality of angular positions about axis 26 relative to arm 12. Specifically, opening 60a in upper arm cap 60 may be round and formed to have a diameter slightly larger than the cross section of main body 76b of attachment member 76. The main body of the attachment member slidably bears against the mouth of opening 60a, allowing free rotation of attachment member 76 relative to upper arm cap 60. Similarly, tang 90a slides within circumferential groove 76c to permit free rotation of attachment member 76 relative to arm 12, while simultaneously preventing the attachment member from pulling out of the upper arm cap.

In operation, it is often desirable that the platform assembly be maintained in one or more predefined rest positions, or stops, selected from the plurality of angular positions. For example, it is normally desirable that a support platform, such as that shown in FIG. 1, be maintained in a deployed orientation that is parallel to the floor or ground surface. As will be later explained, attachment member 76 and various structures of arm 12 may be adapted to securely maintain the attachment member, and thus the support platform, in one or more predefined stops or rest positions relative to arm 12.

Still referring to FIG. 3, upper arm cap 60 may include a bottom portion 60c that has a smaller cross-section than the rest of the arm cap, to permit insertion of the arm cap into the top of upper arm section 28. Fasteners 100 secure upper arm section 28, upper arm cap 60 and sleeve 90 together. Specifically, the depicted fasteners extend first, through holes 28a provided on upper arm section 28, then through corresponding holes 60d on the portion of upper arm cap 60 inserted into upper arm section 28, and finally into corresponding threaded holes 90b provided on sleeve 90. The depicted fasteners are threaded screws, though a variety of other fasteners may be used.

Figure 4:
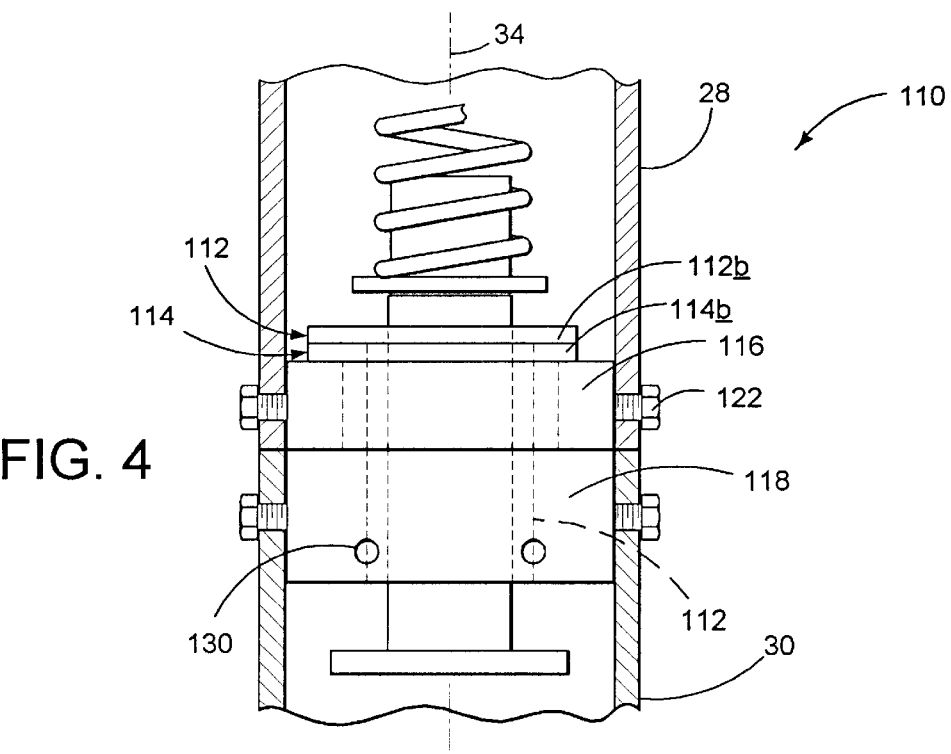
FIG. 4 is a partial cross-sectional view of the stowable support system of FIG. 3, showing a coupler used to moveably couple the arm sections shown in FIG. 3.

Referring now to FIGS. 3 and 4, a coupler 110 may be provided to moveably couple upper arm section 28 to lower arm section 30, so that the arm sections are rotatable relative to one another about axis 34. As will be explained, coupler 110 may be adapted to limit this rotation to a prescribed range and prevent arm sections 28 and 30 from being pulled apart longitudinally along axis 34.

As indicated in FIG. 3, coupler 110 may include an inner coupler sleeve 112, an outer coupler sleeve 114, an upper coupler block 116 and a lower coupler block 118. These components are all provided with central passages to allow the components to be fitted together, and to accommodate movement of follower assembly 120 (as will be later explained).

In the depicted embodiment, upper coupler block 116 is secured within a bottom portion of upper arm section 28 with fasteners 122 that extend through corresponding holes provided in upper arm section 28 and upper coupler block 116. Lower coupler block 118 may similarly be secured within the upper portion of lower arm section 30 with fasteners 124. The upper and lower arm sections are typically aligned end-to-end so that the coupler blocks abut (or nearly abut) one another. As will be explained in more detail with reference to FIGS. 5–7, the upper and lower coupler blocks may be provided with a boss-and-groove arrangement to define a range of rotation of arm sections 28 and 30 relative to one another about axis 34.

As seen in FIGS. 3 and 4, outer coupler sleeve 114 may be positioned within cylindrical passage 116a of upper coupler block 116 so that it extends through the upper coupler block. The outside diameter of outer coupler sleeve 114 is slightly smaller than the diameter of passage 116a. The inside diameter of outer coupler sleeve 114 matches the diameter of cylindrical passage 118a, formed through lower coupler block 118, such that outer coupler sleeve 114 and lower arm block 118 combine to define yet another central passage through which inner coupler sleeve 112 is inserted. When so inserted, inner coupler sleeve 112 extends through the upper and lower coupler blocks, as best seen in FIG. 4. Both coupler sleeves include larger diameter rim portions 112b and 114b at the top of the sleeves to limit insertion of the sleeves through the coupler blocks.

Because various contacting surfaces of the coupler components are curved, coupler 110 permits rotation of upper arm section 28 about axis 34 relative to lower arm section 30. In addition, because it extends through both the upper and lower coupler blocks, inner coupler sleeve 112 holds upper arm section 28 and lower arm section 30 aligned along axis 34. Finally, pins 130 may be positioned within holes extending through lower coupler block 118 so that the pins engage indentations 112a provided on the outer surface of inner coupler sleeve 112. This prevents arm sections 28 and 30 from pulling away from each other along axis 34.

Figure 5:
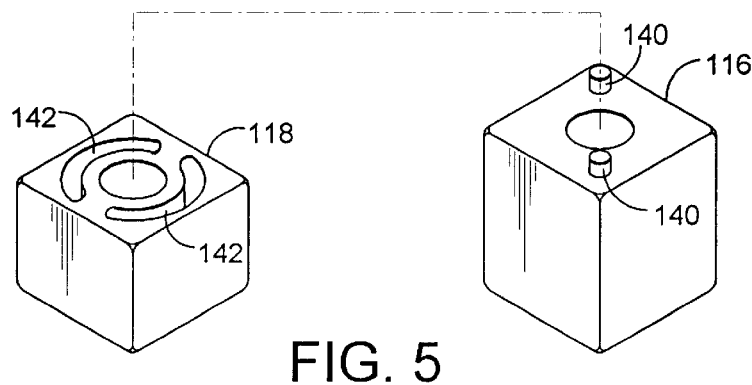
FIG. 5 is an isometric view of a pair of coupler blocks that may be used to construct the coupler shown in FIG. 4.

Referring now to FIGS. 3 and 5–7, a boss-and-groove arrangement for limiting relative rotation between arm sections 28 and 30 about axis 34 will be described. As seen in FIG. 5, the surface of upper coupler block 116 that abuts lower coupler block 118 may be provided with a pair of protrusions, such as bosses 140. The bosses are received by corresponding grooves 142 provided on the facing surface of lower coupler block 118. Alternatively, the arrangement may be reversed, with the bosses provided on the lower coupler block and grooves provided in the facing surface of the upper coupler block.

Figure 6:
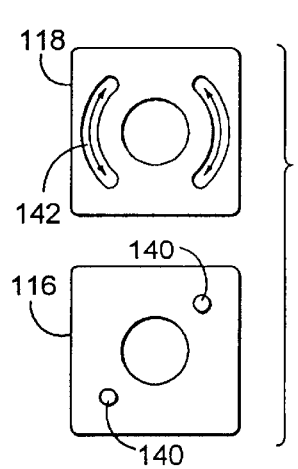
FIG. 6 is an end plan view of the coupler blocks of FIG. 5.

When arm sections 28 and 30 are rotated relative to one another, bosses 140 travel within grooves 142. As seen in FIGS. 5 and 6, the bosses and grooves may be adapted to permit about ninety degrees of relative rotation between coupler blocks 116 and 118, and thus between arm sections 28 and 30. Specifically, bosses 140 travel within grooves 142 as indicated by the arrows in FIG. 6.

Figure 7:
FIG. 7 is an end plan view of a pair of alternately configured coupler blocks.

Alternatively, as revealed by the coupler blocks shown in FIG. 7, different boss-and-groove arrangements may be used to define ranges of rotation, including ranges of rotation other than ninety degrees. Specifically, the embodiment shown in FIG. 7 has a single boss 146, and a corresponding groove 148 that extends approximately halfway around coupler block 118 to permit about one hundred eighty degrees of relative rotation. As indicated by the dashed line, groove 148 may extend even further around coupler block 118 to permit an even greater range of rotation.

Referring now to FIG. 3, to secure arm 12 to seat mount 52, attachment member 80 may extend between brackets 16 and 18 through opposed openings 30a provided in the sidewalls of lower arm section 30. Typically, the openings are sized to have a slightly larger diameter than the cross-section of attachment member 80. The connection between attachment member 80 and lower arm section 30 allows arm 12 to pivot about axis 36 through a plurality of angular positions relative to attachment member 80, and thus relative to seat mount 52. In addition, this connection may be adapted to maintain the arm in one or more predefined rest positions relative to attachment member 80 and the seat mount, as will now be explained.

Referring now to FIGS. 3, 8, 9 and 9A, the stowable support system may also include a follower assembly 120 held within the arm for maintaining the arm in predefined pivotal rest positions relative to platform assembly 50 and/or seat mount 52. For example, in FIG. 1, support platform 24 (a distal structure) is oriented relative to arm 12 so that the platform is generally parallel to the ground and perpendicular to the arm. In addition, it may be desired that the platform be maintained in a position generally parallel to arm 12 when the platform is stowed. At the opposite end of the arm, desired rest positions may include orientations where arm 12 extends vertically upward or downward from the top surface of console box 20, as in the deployed and stowed positions respectively shown in FIGS. 1 and 2. These orientations all correspond to particular, predetermined pivotal rest positions of attachment members 76 and/or 80 relative to arm 12.

Generally, to maintain the stowable system in desired rest positions, follower assembly 120 and/or one or both of attachment members 76 and 80 are adapted to be resiliently deformed when the assembly is rotated out of one of the rest positions. Because the deformation is resilient, i.e. the deformed structures tend to return to their original form or position, the system resists rotation out of the rest positions and is maintained in those positions unless a sufficiently large external pivoting force is applied to the attachment members or arm. In basic physical terms, the system is adapted so that rotating the attachment member away from, or out of, a predetermined pivotal rest position causes relative movement in the form of resilient deformation to occur along axis 34 between the arm and either the attachment member or the follower assembly. The attachment member and follower assembly are urged toward each other (as a result of the resilient character of the deformation) to [frictionally???] resist this relative movement, and thereby resist rotation of the attachment member out of the rest position.

Figure 8:
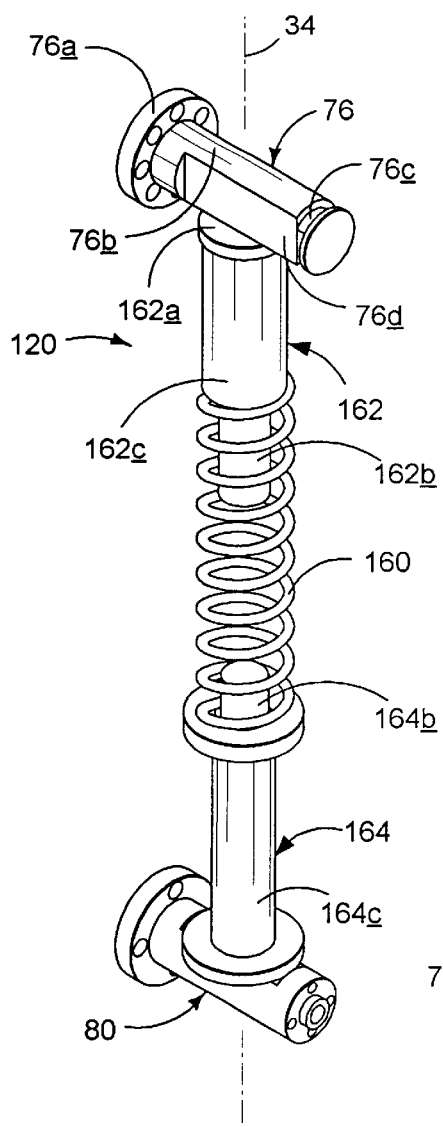
FIG. 8 is an isometric view of a follower assembly for use in the stowable support system of FIG. 1.
Figure 9:
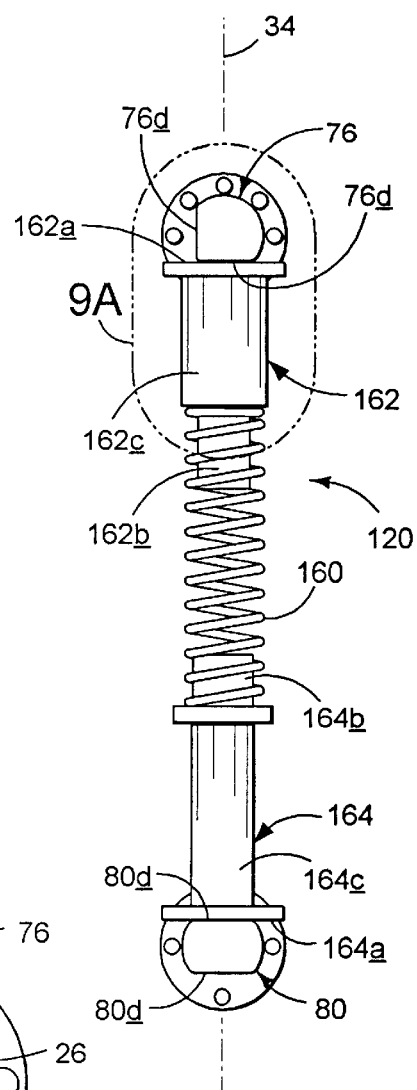
FIG. 9 is a side view of the follower assembly shown in FIG. 8.

This may be achieved by forming attachment members 76 and 80 in a particular shape, and by providing a follower assembly in the form of a spring 160 interposed between followers 162 and 164. The attachment members and follower assembly may be provided with one or more surface portions having cooperating contours. For example, as best seen in FIG. 9, the exterior surface of attachment members 76 and 80 may be formed to have one or more generally planar surfaces, or flats 76d and 80d. Followers 162 and 164 also include substantially flat contacting surfaces 162a and 164a for contacting the exterior surfaces of the attachment members. Followers 162 and 164 further include small diameter body portions 162b and 164b and large diameter body portions 162c and 164c, as seen in FIGS. 8 and 9. The small diameter body portions of the followers extend partially through the coils of spring 160. The ends of the spring bear against the ridges of the followers that are formed by the sharp transitions between the small and large diameter body portions. As seen in FIG. 3, a washer 165 may be provided to bear against the ridge of the lower follower 164, with the spring in turn bearing against the washer.

The contoured surface of each attachment member cooperates with the contoured surface of its respective follower to create rest positions. Specifically, the rest positions occur when the attachment members are rotated into a position in which the planar contacting surface of one of the followers is in mating contact with one of the flats formed on the exterior surface of the attachment members. The contacting portions of the surfaces are thus closely spaced or touching and generally parallel to one another. In FIGS. 8 and 9, the depicted attachment members are all shown in rest positions. In FIG. 1, the attachment member (not shown) connected to support platform 24 is in a rest position.

Figure 9A:
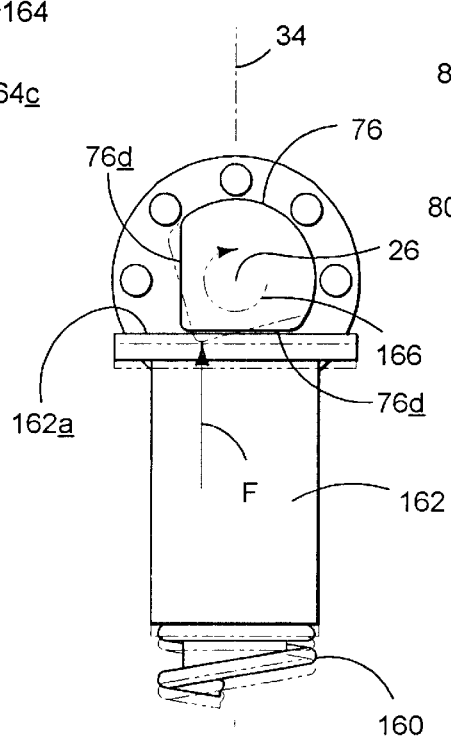
FIG. 9A is an expanded partial side view of the follower assembly shown in FIG. 8, depicting the attachment member rotated slightly out of a rest position.

Attachment members 76 and 80 may be held by arm 12 so that their axes of rotation 26 and 36 are held fixed relative to the arm. As seen in FIG. 9A, when attachment member 76 is rotated from a rest position, the effective radius of the attachment member relative to follower surface 162a increases, causing follower 162 to move downward and compress spring 160. The compressed spring exerts an upward-directed force F upon attachment member 76. Because this force is off-center, i.e., exerted along a line that passes to one side of the attachment member's axis of rotation 26, force F biases the attachment member to rotate clockwise in direction 166, toward the rest position. This off-center force occurs whenever the attachment member is rotated slightly out of the rest position. The attachment member thus will return to the rest position unless a sufficiently large external pivoting force is applied through a range of motion, which passes force F to an opposite side of the attachment member's axis of rotation 26. As indicated, the system may include followers and attachment members at both ends of the arm, in which case spring 160 may be provided to urge the followers apart and into contact with the attachment members to maintain both attachment members in one or more desired rest positions.

Spring 160 is preferably selected so as to provide about 240 pounds of tension when installed. With such a spring, about 12–13 pounds of downward pressure must be exerted on a support platform, such as that depicted in FIG. 1, to stow the support assembly.

As an alternative to the described spring, the system may be adapted so that the attachment members themselves are undeformable, but so that they nonetheless resiliently move relative to arm 12 when the system is pivoted out of a rest position. With this configuration, the axes of rotation of the attachment members are not fixed relative to the arm. Instead, rotating the attachment members out of the rest positions causes relative movement of the rotational axes in a linear direction relative to the arm. By countering this movement and urging the attachment member back toward its original position, the rotation that results in movement of the axis is inhibited.

As yet another alternative, the attachment members themselves may be formed of a resilient material that deforms when the system is rotated out of a rest position. The resilient characteristic of the attachment member, i.e., its tendency to "spring back" into its original shape, inhibits the rotational movements that cause the attachment member to be deformed.

As should be appreciated from FIG. 9, the attachment members may be provided with multiple flats in a variety of orientations to create the desired rest positions. For example, the two flats 80d shown in FIG. 9 are directly opposite one another on the exterior surface of attachment member 80, requiring one hundred eighty degrees of pivotal rotation to rotate the attachment member between the two corresponding rest positions. Referring back to FIGS. 1 and 2, an attachment member having such a configuration could be used at base end 14 of arm 12, to provide two rest positions for the arm, separated by one hundred eighty degrees.

Upper attachment member 76 may have flats 76d that are substantially perpendicular to one another, creating two rest positions that are separated by ninety degrees of pivotal rotation. As seen in FIGS. 1 and 2, an attachment member having this configuration may be used at platform end 22 of arm 12 to provide a first rest position in which support platform 24 is generally perpendicular to arm 12, and a second rest position in which the support platform is folded alongside and generally parallel to the arm. More generally, the attachment members may be provided with flats in varying numbers and configurations to provide one, two or more rest positions having any desired pivotal orientation relative to the arm.

The various components of the arm are adapted to hold the follower assembly aligned within the arm while simultaneously permitting the follower assembly to move unimpeded along axis 34. For example, sleeve 90 includes a central cylindrical passage through which follower 162 extends and is allowed to move. Inner coupler sleeve 112 similarly includes a central through-passage that permits free vertical movement of follower 164 within the desired operational range.

As should be appreciated from the foregoing description, the stowable support system may be easily maneuvered by a user between stowed and deployed positions. Indeed, the system may be operated with one hand. In addition, the unique configuration of the attachment member(s) and follower assembly allows the system to be deployed and maintained in an optimal predefined position without need for locking buttons, tightening knobs or other manually-operated mechanisms.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A stowable support system comprising:
an arm including a follower assembly having a surface portion of a first contour, where the arm is elongate and includes two arm sections aligned end-to-end, the arm sections being rotatable relative to each other about the length of the arm, and
an attachment member pivotal through a plurality of angular positions relative to the arm, the attachment member having a surface portion of a second contour cooperative to the first contour,
at least one of the plurality of angular positions defining a rest position in which the surface portion of the follower assembly is in mating contact with the surface portion of the attachment member,
the follower assembly and attachment member being biased toward engagement with each other with at least on of the attachment member and the follower assembly being adapted to be resiliently deformed when the attachment member is pivoted out of the rest position.

2. The stowable support system of claim 1, where the follower assembly includes a follower and a spring held by the arm, the spring being configured to urge the follower into contact with the attachment member.

3. The stowable support system of claim 2, where the follower includes a planar contact surface for contacting the surface portion of the attachment member.

4. The stowable support system of claim 2, where the arm and attachment member are configured so that the spring is compressed as the attachment member is pivoted out of the rest-position.

5. The stowable support system of claim 1, where the first and second contours are planar.

6. The stowable support system of claim 1, where:
the attachment member includes a plurality of surface portions that each have a contour cooperative to the first contour;
multiple rest positions are defined by mating contact occurring between the surface portions of the attachment member and the surface portion of the follower assembly, each rest position corresponding to the attachment member being pivoted to a different one of the plurality of angular positions; and
the follower assembly and attachment member are biased toward engagement with each other and configured so that, when the attachment member is rotated to a selected one of the multiple rest positions, the attachment member is maintained in the selected rest position until a sufficiently large external pivoting force is applied.

7. The stowable support system of claim 6, where the attachment member includes two surface portions corresponding to two rest positions, and where the attachment member pivots approximately 90 degrees between the two rest positions.

8. The stowable support system of claim 7, further comprising a support platform secured to the attachment member, where the support platform is in a deployed position when the attachment member is one of the two rest positions, and in a stowed position when the attachment member is in the other of the two rest positions.

9. The stowable support system of claim 6, where the attachment member includes two surface portions corresponding to two rest positions, and where the attachment member pivots approximately 180 degrees between the two rest positions.

10. A stowable support system, comprising:
an arm including a follower assembly having a surface portion of a first contour; and
an attachment member pivotal through a plurality of angular positions relative to the arm, the attachment member having a surface portion of a second contour cooperative to the first contour,
at least one of the plurality of angular positions defining a rest position in which the surface portion of the follower assembly is in mating contact with the surface portion of the attachment member,
the follower assembly and attachment member being biased toward engagement with each other with at least one of the attachment member and the follower assembly being adapted to be resiliently deformed when the attachment member is pivoted out of the rest position,
where the arm has a support end configured to be operatively secured to a supported object, and a base end opposite the support end, the base end being configured to be operatively secured to a base,
where the attachment member is a support end attachment member associated with the support end of the arm, and where the surface portion of the follower assembly is provided on a support end follower associated with the support end of the arm, the follower assembly further comprising a spring configured to bias the support end follower toward engagement with the support end attachment member, and
where the follower assembly further includes a base end follower associated with the base end of the arm, the base end follower including a surface portion of a third contour, the stowable support system further comprises a base end attachment member associated with the base end of the arm, the base end attachment member being pivotal through a plurality of angular positions relative to the arm, the base end attachment member having a surface portion of a fourth contour cooperative to the third contour, at least one of the plurality of angular positions of the base end attachment member defines a rest position in which the surface portion of the base end follower is in mating contact with the surface portion of the base end attachment member, and the spring is further configured to bias the base end follower toward engagement with the base end attachment member.

11. The stowable support system of claim 10, where the spring is interposed between the support end follower and base end follower and urges them apart.

12. The stowable support system of claim 1, further comprising a support platform secured to the attachment member.

13. The stowable support system of claim 1, where the attachment member pivots relative to the arm about an axis that is generally perpendicular to the arm.

14. The stowable support system of claim 1, where one of the arm sections includes a groove for receiving a boss included on the other arm section, and where the boss travels within the groove as the arm sections are rotated relative to one another, the groove and boss being configured to define a range of rotation of the arm sections relative to one another.

15. A stowable support system, comprising:
an elongate arm having an at least partially hollow interior;
an attachment member moveably secured to the arm so that the attachment member pivots about an axis generally perpendicular to the arm through a plurality of angular positions, the attachment member having an exterior surface including first and second generally planar surface portions;

a follower configured to contact the exterior surface of the attachment member, where the plurality of angular positions include a deployed rest position in which the follower is in mating contact with the first surface portion and a stowed rest position in which the follower is in mating contact with the second surface portion; and a spring held at least partially within the interior of the arm and adapted to urge the follower into contact with the exterior surface of the attachment member so that, when the attachment member is pivoted out of either of the rest positions, the attachment member is maintained in the respective rest position until a sufficiently large external pivoting force is applied.

16. A moveable support system, comprising:

an arm having opposed ends;

a pair of attachment members moveably secured to the opposed ends of the arm so that each attachment member pivots through a plurality of angular positions relative to the arm, each attachment member having an exterior surface including two planar surface portions, one of the attachment members being configured for attachment to a base, the other of the attachment members being configured for attachment to a deployable object; and a spring held by the arm and interposed between a pair of followers so that the followers are urged into engagement with the exterior surfaces of the attachment members, where:

for each attachment member and its engaged follower, the plurality of angular positions include a deployed rest position in which the follower is in mating contact with one of the surface portions and a stowed rest position in which the follower is in mating contact with the other of the surface portions; and the spring is compressed when the attachment members are rotated out of the rest positions such that the attachment members are maintained in the rest positions until a sufficiently large external pivoting force is applied.

17. The moveable support system of claim 16, further comprising a support platform secured to said other of the attachment members.

18. The moveable support system of claim 17, where said other of the attachment members is pivoted approximately 90 degrees between the deployed rest position and the stowed rest position.

19. The moveable support system of claim 16, where the arm is elongate and includes two arm sections aligned end-to-end, the arm sections being rotatable relative to each other about the length of the arm.

20. The moveable support system of claim 19, where one of the arm sections includes a groove for receiving a boss included on the other arm section, and where the boss travels within the groove as the arm sections are rotated relative to one another, the groove and boss being configured to define a range of rotation of the arm sections relative to one another.

21. The moveable support system of claim 16, where each attachment member pivots about an axis generally perpendicular to the arm.

\* \* \* \* \*